May 21, 1968     C. A. ZLOTNICKI     3,384,411

LAZY TONG PLIERS

Filed Oct. 25, 1966

INVENTOR.
CHESTER A. ZLOTNICKI
BY
*Robert Himes Shorter*
ATTORNEY

United States Patent Office 3,384,411
Patented May 21, 1968

3,384,411
LAZY TONG PLIERS
Chester A. Zlotnicki, 35 Mayflower Ave.,
Stamford, Conn. 06902
Filed Oct. 25, 1966, Ser. No. 589,313
5 Claims. (Cl. 294—119)

ABSTRACT OF THE DISCLOSURE

Pliers or tongs for gripping flesh, such as fish and particularly eels, are in the form of a lazy tongs with flat, pivoted elements having at least one pair of handle elements pivoted near their centers and one pair of jaw elements pivoted nearer the jaw end than the other end whereby the jaw ends are stiff enough to prevent sideways bending. The jaw elements have a row of sharp teeth at an angle to the axis of the pivots and the ends of the handle elements and each end of a jaw element opposite the jaw are rounded. Preferably finger holes are provided in the handle elements at right angles to the plane of the elements so that single-handed operation is possible, the extension of the lazy tongs being sufficiently long so that fish such as eels will not wrap themselves around the fisherman's hand or arm, and the tongs collapse to a compact form suitable for carrying in a pocket without substantial protection of any handle elements.

Background of the invention

The problem of holding fish firmly so as to remove a hook, scale of the fish or for any other purpose in which it is necessary to hold the fish without possibility of slippage is a problem which has been realized for almost a century. There have been developed pliers or tongs with sharp projections, teeth or ridges which bite into the flesh of the fish and hold regardless of the struggles of the fish or its slippery skin. A number of pliers have been patented, a typical one being described in the Detwiler Patent 2,-653,844. This design of pliers has achieved large commercial success and for the fish for which it is suited, the majority of fish, it solved the problem completely. There are however, certain kinds of fish, of which eels are the most important representative, where the regular pliers are not fully satisfactory because the user's hand is fairly near the gripping jaws and therefore an eel tends to try to wrap himself around the user's arm which is always unpleasant and in the case of certain eels such as Moray eels or electric eels may even be dangerous. It is with the solution of this special problem that the present invention deals. Inasmuch as the pliers of the present invention are cheap, compact and reliable they are also useful for fish that do not have to be held at a distance from the user's hands. In other words, the pliers of the present invention may be considered as an improvement on the customary pliers because they can be used both for the type of fish for which the known pliers are effective and for the particular problems which they solve.

Reference has been made particularly to eels. It should be noted however, that the same problem also occurs with certain other kinds of fish such as blue fish which, because of their extremely dangerous teeth are safer if held at a greater distance from the user's hand, even though with care ordinary fish pliers can be used. Another situation for which the pliers of the present invention are useful is in outdoor cooking of meats such as steaks. These are often cooked over a charcoal fire and it is desirable to be able to turn the meat during cooking and eventually to remove it without risk of burning one's hand. Usually asbestos gloves are used and sometimes a long handled set of tongs have been employed but the pliers of the present invention are particularly convenient even though their extreme compactness, which will be brought out below and which is so important for the fisherman, may not be as essential for the person cooking meat in his backyard. Nevertheless, the additional field of utility makes for an added versatility of the present invention and so is an advantage. Because of the fact that the most important use of the pliers of the present invention is for grasping eels, the remainder of the specification will be described more particularly in conjunction with this important use which is typical, it being understood of course that the pliers are not limited to use for holding eels and can be used in any other situations where their characteristics make them desirable.

Summary of the invention

Essentially the present invention provides for extensible tooth pliers in the configuration which is often referred to as the lazy tongs, this permits collapsing the pliers into a very small space so that they can be carried in the pocket of the fisherman or in his tackle box without taking up excessive room which is an extremely important characteristic for eel pliers. Also the pliers are useable with one hand just as the standard fish pliers. In other words the pliers of the present invention not only perform a new and important function of keeping the fish or other object gripped at a distance from the user's hand but at the same time they have no disadvantage and share all of the advantages of standard pliers. A further advantage is that an eel will wrap himself around the pliers rather than the fish line.

While the pliers of the present invention are preferably made of flat metal strips jointed with rivets or other suitable fasteners, it is of course possible to use other metal shapes but as this normally adds to the weight and room taken up by the pliers it is preferred to form the pliers of flat metal pieces. The flat shape and wide open teeth makes cleaning easier. The pliers of the present invention have a very important additional requirement. The tooth jaws must not bend easily away from each other as otherwise a fish or other object could spread them apart and slip out. Sufficient stiffness against sidewise bending is therefore an essential characteristic of the pliers of the present invention. This stiffness can of course be obtained with thicker material regardless of the configuration of the toothed jaws. However this adds to weight and size and it is preferred therefore to obtain the requisite stiffness by locating the joint, about which the toothed jaws open, sufficiently near to the opening so that even the flat metal has sufficient stiffness to resist sidewise bending under normal use. In the more specific aspect of the invention this preferred form of pliers of flat metal pieces of moderate thickness and location of the joint for the tooth jaw opening close to the opening itself are included and this constitutes the preferred overall design.

The material of which the pliers are made is not critical but as they are normally used for holding eels and other fish the material must be sufficiently resistant to corrosion so that serious rusting will not take place either during use or when the slimy coatings of the fish skin are washed off. The metal which has the greatest combination of desirable properties including moderate cost is aluminum. It is light and can be formed into thick enough blades to have adequate stiffness and, particularly when anodized, has adequate resistance to corrosion. Other metals may be used such as stainless steel which however is heavier, coated steels and the like may also be employed. Where cost is not a particularly important consideration, titanium is an excellent material, but as it does not have important advantages over aluminum usually its higher price makes it economically less attractive in spite of its excellent technical properties. Of course, the present invention does not exclude the use of steels which could rust, but these materials are less desirable than the preferred aluminum.

Description of the preferred embodiments

Figure 2:
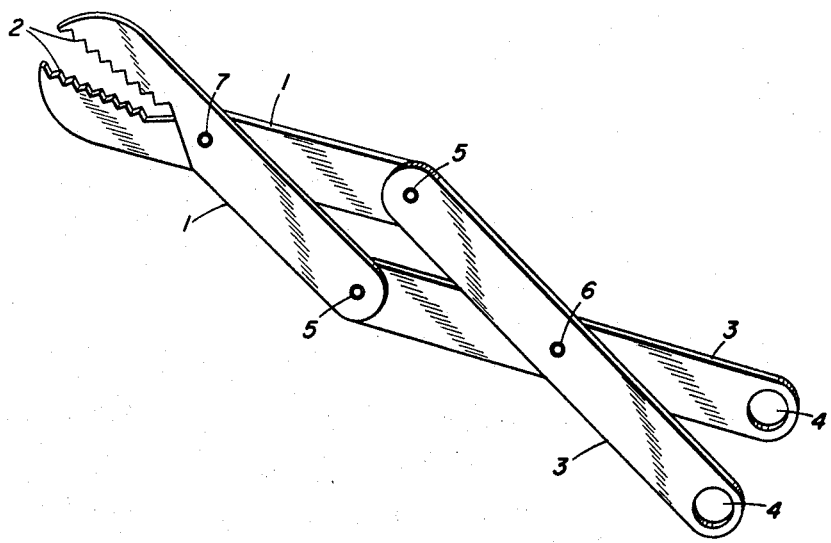
FIG. 2 is an elevation of the same pliers in their extended form.
Figure 1:
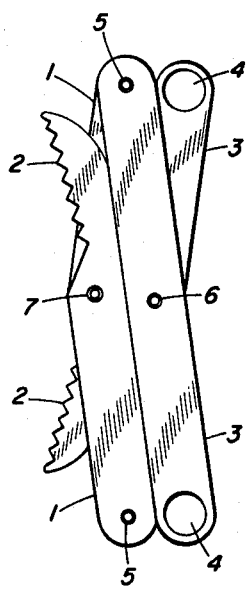
FIG. 1 is an elevation of the pliers collapsed for storage.

The pliers are formed of a pair of flat metal members 1, the ends being cut out in the form of long sharp teeth 2, a second pair of flat metal members 3 are provided at one end with finger holes 4 and are joined at their other ends to the toothed ends of the members 1 with rivets 5 which act as pivots. The center of the members 3 are also pivoted with a rivet 6 and the members 1 pivoted with rivet 7 which is sufficiently close to the toothed jaw openings so that the teeth will not bend sideways under ordinary use. Where the pliers are made of fairly thick metal, the particular location of the rivet 7 is not so important as they are stiff enough so that the tooth jaws will not bend even if they pivot some distance from the openings of the jaws. However, with thinner metal members, which is preferred for lightness and compactness, the location of the rivet or pivot 7 is important and should be sufficiently near the jaw opening so that there is no problem presented of inadequate stiffness of the jaws. The drawings show a preferred form of pliers of fairly thin aluminum members and it will be seen that the pivot 7 is much closer to the jaws than is the pivot 6 from the ends of the members 3. This has the additional advantage that it increases the leverage and requires a grip of less strength to hold adequately an eel or other fish. When collapsed as shown in FIG. 1 it will be seen that the pliers are extremely compact and can practically be carried in a fisherman's hip pocket if desired. The exact length of the members 1 and 3 is not critical but they should be long enough so that when the pliers are gripping an eel, that is in their extended form shown in FIG. 2, the eel in its struggle to wrap itself around the extended pliers will not wrap itself around the hand or arms of the fisherman. For most eels an extended length of slightly over a foot is sufficient and this can be obtained with members of about seven inches.

For some purposes an even longer reach is desirable but it is normally preferable to obtain the longer reach by interposing a third pair of pivoted members between the members 1 and 3 in conventional lazy tong form. As this provision for another pair does not depart from ordinary constructional designs for lazy tongs it is not illustrated. With another pair a length of over a foot and a half is easily obtained which is sufficient even for very large eels or for other uses where a greater distance from the toothed jaw to the user's hands is desirable. At the same time when collapsed the pliers are still quite compact and can fit readily into a tackle box or a fairly large pocket in the fisherman's garments. When a third pair of members is used for greater length it is sometimes desirable to use somewhat thicker metal members although with pliers extended to a foot and a half this is ordinarily not needed and the thickness which will assure adequate stiffness of the toothed jaws against sideways bending will ordinarily suffice. Ordinarily the pliers will be made all of the same metal, such as anodized aluminum, but of course it is perfectly practical to have members 1 made of a different metal of the members 2. For example a metal which either is harder or has a higher melting point, in the case of pliers which are to be used for outdoor cooking of steaks and other meats. The essentials of the present invention, namely the lazy tong formation with toothed jaws which do not bend sideways form the real heart of the present invention and the possibilities of various minor modifications such as materials to be used for the members of the pliers do not affect their design and operation significantly and can be chosen for other considerations. In the same manner the finger holes 4 in the member 3 may be replaced by other suitable grip design such as, for example, a hook as is shown in the Detwiler patent.

It will be noted that the row of teeth 2 on each jaw element is at an angle to the line between pivots 5 and 7. It will also be noted that the pivot 6 is substantially in the center of the handle elements 3. As a result, when collapsed, as shown in FIG. 1, there are no projecting handle elements and the rounded ends of the handle elements 3 and the ends of the jaw elements 1 opposite from the jaws are rounded so that a compact structure results that can easily be carried in a fisherman's pocket. It will also be noted that since the finger holes 4 are at right angles to the plane of the handle elements 3, fingers can be inserted through them, which permits easy and reliable one-hand operation.

I claim:
1. Pliers for gripping material, such as animal flesh, and in gripped form holding the object gripped at a safe distance from the user's hand, which comprises,
   (a) a plurality of pairs of pivoted metal members connected in the form of a lazy tongs, one pair of said members constituting handle members and having a pivot substantially in the center of their respective lengths, whereby the pliers are capable of collapsing into a compact space without substantial protrusion of the ends of the handle members,
   (b) a second pair of members constituting jaw members having jaw portions at one end provided with long, sharp, pointed teeth, a line across the points of said teeth on each jaw being at an angle to a line between a pivot connecting the jaw members and a pivot connecting each jaw member with the next member in forming the lazy tongs,
   (c) said one pair of handle members having free ends, the free ends having means for gripping and actuating the jaws of said pliers with one hand, and
   (d) the members being of materials of sufficient stiffness and the pivot for the jaw members being closer to the jaw ends than to the opposite ends, so that when the lazy tongs are extended and gripping an object the jaws do not bend substantially sideways and when the tongs are collapsed the jaw members do not project beyond any other members.
2. Pliers according to claim 1 in which the pivoted members are of flat metal.
3. Pliers according to claim 2 in which the metal is aluminum.
4. Pliers according to claim 2 in which all of the ends of the flat metal members are rounded.
5. Pliers according to claim 1 in which the said actuating means include finger holes in the said free ends at right angles to the plane of the pivoted members.

References Cited

UNITED STATES PATENTS

| | | | |
|---|---|---|---|
| 656,492 | 8/1900 | Vogel | 81—348 |
| 557,480 | 3/1896 | Boyd | 294—119 X |
| 736,671 | 8/1903 | Aksila | 81—348 X |
| 1,393,399 | 10/1921 | Schlehr | 81—418 |
| 1,549,836 | 8/1925 | Hopp | 294—119 |

FOREIGN PATENTS

| | | |
|---|---|---|
| 708,981 | 5/1954 | Great Britain. |
| 176,217 | 3/1922 | Great Britain. |

WILLIAM W. DYER, Jr., *Primary Examiner.*

WILLIAM FELDMAN, *Examiner.*

G. WEIDENFELD, *Assistant Examiner.*